US007313713B2

(12) United States Patent
Weber et al.

(10) Patent No.: US 7,313,713 B2
(45) Date of Patent: Dec. 25, 2007

(54) SEQUENTIAL/COMBINATIONAL LOGIC TRANSISTOR SEGREGATION FOR STANDBY POWER AND PERFORMANCE OPTIMIZATION

(75) Inventors: Eugene F. Weber, Emmaus, PA (US); Matthew R. Henry, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 449 days.

(21) Appl. No.: 10/923,403

(22) Filed: Aug. 20, 2004

(65) Prior Publication Data

US 2006/0041768 A1 Feb. 23, 2006

(51) Int. Cl.
*G06F 1/32* (2006.01)
(52) U.S. Cl. .................................. 713/324; 713/323
(58) Field of Classification Search ................ 713/300, 713/320, 323, 324
See application file for complete search history.

(56) References Cited

U.S. PATENT DOCUMENTS

| | | | | |
|---|---|---|---|---|
| 5,862,437 A | * | 1/1999 | Kutsuwada et al. | 399/88 |
| 6,282,666 B1 | * | 8/2001 | Bays et al. | 713/323 |
| 6,430,693 B2 | * | 8/2002 | Lin | 713/322 |
| 6,744,301 B1 | * | 6/2004 | Tschanz et al. | 327/534 |
| 6,931,557 B2 | * | 8/2005 | Togawa | 713/323 |
| 2005/0035345 A1 | * | 2/2005 | Lin et al. | 257/20 |

* cited by examiner

*Primary Examiner*—Dennis M. Butler
(74) *Attorney, Agent, or Firm*—Synnestvedt & Lechner LLP

(57) ABSTRACT

A method and apparatus for powering digital logic circuits that provides low power consumption while maintaining high performance. The circuit is divided into logic elements necessary for maintaining the state of the circuit and those that are not. The state-maintaining logic uses low-leakage, low performance transistors, and is continually powered. The remainder of the circuit uses standard transistors, i.e., high performance, high-leakage transistors, and is only powered when the circuit is active, i.e., not in a standby mode. Two power rails are used, one for the state maintaining components and one for the non-state-maintaining components. The state-maintaining logic is functionally separated from the remainder of the circuit when the remainder of the circuit is being powered up or down to avoid short-circuiting any elements. Typical state-maintaining components are sequential logic gates. Typical non-state maintaining components are combinational logic gates. A typical functional isolation gates is a NOR gate.

14 Claims, 2 Drawing Sheets

SEQUENTIAL/COMBINATIONAL LOGIC TRANSISTOR SEGREGATION FOR STANDBY POWER AND PERFORMANCE OPTIMIZATION

FIELD OF THE INVENTION

The present invention relates to the field of integrated electronic logic circuit design, and particularly to methods and apparatus for providing power to digital logic circuits so as to provide high performance and low power consumption.

BACKGROUND OF THE INVENTION

Portable, battery powered devices, such as laptop computers and mobile telephones, require compact logic circuits that provide both high performance and low power consumption. It is also important that when the logic circuits in such devices are in an inactive, standby mode, their power consumption is as low as possible so that their drain on the battery is minimized.

As integrated circuit fabrication progresses to smaller geometry technologies, increased transistor performance is gained at the expense of increased leakage currents (also known as "high Ioff" currents). These leakage currents increase a circuit's power consumption, especially in standby modes, making the high performance, low power requirements of portable, battery powered devices more difficult to attain. Although specialized low-leakage, small geometry transistors can be designed by, for instance, increasing their gate oxide thickness and therefore threshold voltage, these transistors have a correspondingly lower performance, i.e., their switching rate is significantly slower.

In order to provide small geometry circuits with high performance and low power consumption, designers mix low-leakage, low performance transistors with high performance, high-leakage transistors (hereinafter referred to as "standard transistors") by using the low-leakage transistors for circuit elements that do not require high performance. This may be done by, for instance, initially designing the circuit using logic cells comprised entirely of standard transistors. The circuit can then be analyzed to identify those logic cells in which there is a "delay margin", i.e., those logic cells whose time to change state is not critical to the performance of the overall circuit. The logic cells with a delay margin can then be replaced with equivalent logic cells that use low-leakage, low performance transistors. Alternately, the initial circuit may be designed using only low-leakage, low performance logic cells. The design may then be analyzed to identify the logic cells that fail timing requirements, and those logic cells replaced with equivalent logic cells that use standard transistors.

The major problem with both of these approaches is that they have unpredictable results. In particular, it is not possible to know if the final design's performance and/or leakage requirements will be achieved until the end of the integrated circuit design process, meaning that multiple design iterations are usually necessary to achieve a required result. Moreover, any changes in the logic design late in the development cycle can have unpredictable affects on the final performance.

What is needed is a method of combining logic cells made from low leakage, low performance transistors with standard, high performance, high leakage transistors into a circuit that can be designed to have predictable, high performance and low overall leakage, and whose design can be modified at any stage in the development cycle without introducing unpredictable results.

SUMMARY OF THE INVENTION

The present invention provides a method and apparatus for powering digital logic circuits so as to reduce the power consumption while maintaining high performance.

In a preferred embodiment, the circuit is divided into logic elements necessary for maintaining the state of the circuit and those that are not necessary to maintain the state. The state-maintaining logic is then designed using low-leakage, low performance transistors, and is continually powered. The remainder of the circuit is designed using standard transistors, i.e., high performance, high-leakage transistors, and is only powered when the circuit is active, i.e., not in a standby mode. Two power rails are used to facilitate the division of power, and, to avoid short-circuiting any elements, the state-maintaining logic is functionally separated from the remainder of the circuit when the remainder of the circuit is powered down.

In a further preferred embodiment of the invention, the state-maintaining components are identified as the sequential logic gates in the circuit, while the non-state maintaining components are identified as the combinational logic gates in the circuit. The functional outputs of the sequential logic gates are separated from the functional inputs of the combinational logic gates by an "isolation gate", such as a NOR gate (although numerous logical isolation mechanisms are equivalent). The sequential logic gates and the isolation gate are powered by a first power rail which is always on, while the combinational logic is powered by a second power rail that only supplies power when the circuit is active, i.e. the second power rail does not supply power when the circuit is in a standby mode. The isolation gate ensures that the functional inputs to the combinational logic is in a "low" (also know as "off") state whenever the second power rail is turned off or on, thus avoiding short circuits (also known as "cross-bar currents"). In this way, the circuit has high performance with low power consumption, reducing the drain on batteries in battery powered circuits.

These and other features of the invention will be more fully understood by references to the following drawings.

DETAILED DESCRIPTION

The present invention relates to methods and apparatus for reducing the power consumption of electronic circuits, particularly digital logic circuits for use in battery powered applications, such as lap-top computers or mobile cellular telephone devices, and will now be described in more detail by reference to the accompanying drawings, in which, as far as possible, like numbers represent the same or like elements.

Figure 1:
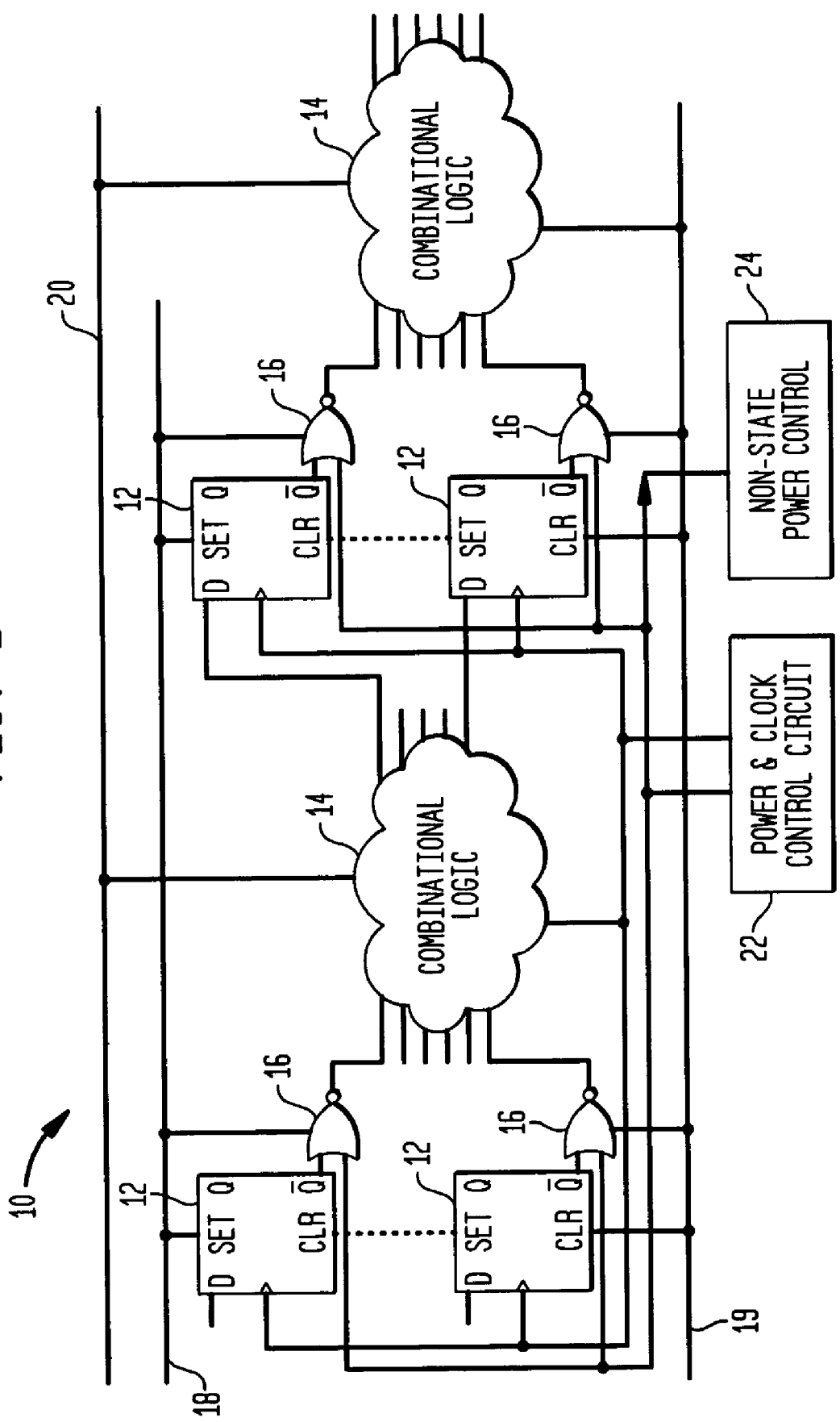
FIG. 1 is a schematic diagram showing an exemplary embodiment of the present invention.

FIG. 1 is a schematic diagram of an exemplary embodiment of the present invention, comprising a digital electronic circuit 10, a state-maintaining logic cell 12, a non-state-maintaining logic cell 14, an isolation cell 16, a state power rail 18, a non-state power rail 20, a common ground rail 19, a non-state isolation & clock control circuit 22 and a power supply & control circuit 24.

The digital electronic circuit 10 may be any digital logic circuit. The state-maintaining logic cells 12 and the isolation gate 16 are powered from a state-power rail 18, which always supplies power when the circuit is on, even when the circuit is in a standby mode or inactive. The non-state-maintaining logic cells 14 are powered from a non-state power rail 20, which only supplies power when the circuit is active. When the circuit is in a standby mode, the non-state-maintaining logic cells do not receive any power. By constructing the state-maintaining logic cells from low-leakage transistors, and the non-state-maintaining logic cells from high performance, standard transistors, the circuit combines high performance with low power consumption. The arrangement is particularly effective for reducing standby power requirements, i.e., the power consumed when the circuit is on, but inactive, as the only transistors receiving power in the standby mode are low-leakage transistors. Low standby power consumption is particularly important for battery powered devices, such as cellular telephones, that may spend a considerable portion of their time on, but in a standby mode waiting to be activated.

Each functional output of the state-maintaining logic 12 is separated from the functional input to the non-state maintaining logic 14 by an isolation gate 16. This isolation gate 16, allows the input to the non-state maintaining logic 14 to be set "low" (also known as "off") before power is either supplied to or removed from non-state power rail 20. Setting all the inputs of the non-state maintaining gates "low" before switching power states functionally isolates the state-maintaining components from the non-state-maintaining components and prevents short circuiting any of the logic elements (also known as "creating crowbar currents"). Non-State isolation & clock control circuit 22 and power supply & control circuit 24 contain the circuitry necessary to isolate the logic cells before switching power states, and also, on powering up non-state power rail 20, to ensure that all non-state maintaining logic cells are fully powered before functionally reconnecting the non-state components to the state-maintaining components.

In a preferred embodiment, state-maintaining logic cell 12 is comprised of sequential logic cells having low-leakage transistors, and isolation gate 16 is comprised of combinational logic cells having low-leakage transistors. Sequential logic cells maintain the state of circuit because their outputs depend on the prior state of those outputs. Sequential logic cell functions include, but are not limited to, all categories of well known flip-flop and latch logic circuits.

In a preferred embodiment, non-state-maintaining logic cell 14 is comprised of combinational logic cells having high performance transistors, i.e., standard transistors with fast switching capability but high leakage current. The output of a combination logic cell is determined solely by the logical function being performed and the logical input states at that particular moment. Combinational logic cell functions include, but are not limited to, gates constructed from the well known fundamental gates, i.e., the AND, OR and NOT gates, and combinations thereof.

In an exemplary embodiment, isolation cell 16 is a NOR gate. Isolation cell 16 could also be any logically equivalent circuit such as, but not limited to, an AND gate with an inverter.

Figure 2:
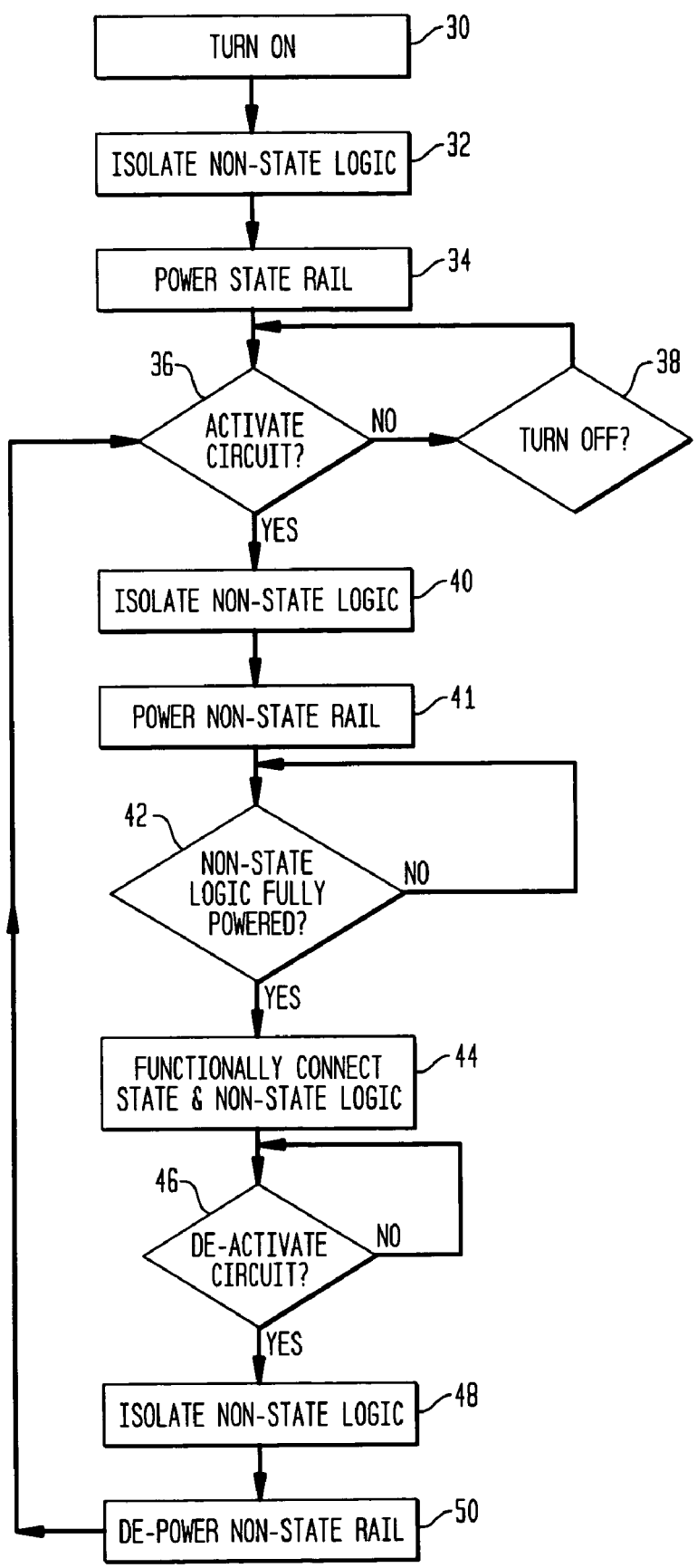
FIG. 2 is a flow chart showing an exemplary embodiment of the present invention.

FIG. 2 is a flow diagram showing the steps in supplying power to a circuit in an exemplary embodiment of the present invention. In step 30, the circuit is turned on, leading to step 32 in which the state and non-state rails are both powered. Subsequently, in step 34, the non-state logic 14 is isolated. In a preferred embodiment, the step of isolating the non-state logic is accomplished using a NOR gate connected between the functional output of the state maintaining logic cell 12, and the functional input to the non-state-maintaining logic cell 14. The non-state power rail is then switched to a power down state, i.e., power is removed from the non-state power rail in step 36. The circuit is now in an inactive or standby mode, and in step 38, the circuit tests to see if the full functionality of the circuit needs to be activated.

Looping at step 38 is essentially the standby mode.

If step 38 discovers that full functionality is now required, the circuit goes to step 40, in which the non-state power rail is switched to a power-on state. In step 42, the circuit checks if the non-state logic, i.e., the non-state-maintaining components of the circuit, is fully powered up and ready to resume operation. Once the non-state logic is fully powered, in step 44 the state and non-state logic is functionally connected, i.e., all the functional outputs of the state-maintaining components are functionally linked to the functional inputs of the non-state-maintaining components. In a preferred embodiment, this functional link is made via an isolation gate such as, but not limited to, a NOR gate. At this point the isolation and clock control circuit 22, begins or resumes clocking the circuit.

In step 46, the circuit checks if de-activation is required. If de-activation is not required, the circuit loops back to test if de-activation is required. At this point, the circuit is active, and power is being supplied to all components by both power rails. There may be a delay timer in the de-activation test step 46 to ensure that the test step does not occupy too much of the circuits processing capability.

If the circuit does require de-activation, it loops back to step 34 in which the non-state logic is isolated, i.e., the non-state-maintaining components are functionally isolated from the state-maintaining components. Once isolation step 34 is complete, the non-state power rail is powered down in step 34, thereby removing power from all the non-state-maintaining components, and the device enters a standby mode, looping at step 38, in which power is only supplied to the circuit's state-maintaining components via the state power rail.

Step 48 on the flow diagram is the entry point to the circuit turn off process. In step 50 the non-state logic is isolated. Depending on what the state of the circuit is when the turn off is asserted, non-state logic may already be isolated. The non-state rail is then powered down in step 52, and the state rail subsequently powered down in step 54. This sequence ensures that there is no short circuiting of any logic elements.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention

What is claimed:

1. A method of powering an electronic circuit having an active mode of operation and an inactive mode of operation, said electronic circuit comprising a state-maintaining component and a non-state-maintaining component, said method comprising the steps of:

a) supplying power to said state-maintaining component; and b) supplying power to said non-state-maintaining component only when said circuit is in said active mode of operation;
wherein said state-maintaining component comprises a sequential logic gate and said non-state-maintaining component comprises a combinational logic gate.

2. The method recited in claim 1, wherein said electronic circuit further comprises a first power rail and a second power rail and wherein step a) comprises supplying power from said first power rail, and said step b) comprises supplying power from said second power rail.

3. The method recited in claim 1 wherein step b) comprises switching on said second power rail to said non-state maintaining component when said circuit enters said active mode.

4. The method recited in claim 3 further comprising the step of:
c) isolating said state-maintaining component from said non-state-maintaining component when said circuit switches from said inactive mode to said active mode.

5. The method recited in claim 4 wherein said electronic circuit further comprises an isolation gate functionally linking said state-maintaining component to said non-state-maintaining component and wherein step c) comprises supplying a signal to said isolation gate during said switching, said signal chosen to functionally isolate said non-state-maintaining component from said state-maintaining component.

6. The method recited in claim 5, further comprising the step of switching said second power rail to a power-off state while said non-state-maintaining component is functionally isolated.

7. The method of claim 5 wherein said isolation gate comprises a NOR gate or logically equivalent isolation mechanism.

8. The method recited in claim 1, wherein said sequential logic gate comprises a high threshold switching-voltage, low-leakage transistor, and wherein said combinational logic gate comprises a low threshold switching-voltage, high-performance transistor.

9. An electronic circuit having an active mode of operation and an inactive mode of operation, said circuit comprising:
a state-maintaining component;
a non- state-maintaining component; and
a power supply adapted to power said state-maintaining component when said circuit is in said inactive mode and in said active mode and to power said non-state-maintaining component only when said circuit is in said active mode;
wherein said state-maintaining component comprises a sequential logic gate and said non-state-maintaining component comprises a combinational logic gate.

10. The circuit recited in claim 9, further comprising a first power rail supplying power to said state-maintaining component, and a second power rail supplying power to said non-state-maintaining component.

11. The circuit recited in claim 10, further comprising an isolation gate functionally linking said state-maintaining component to said non-state-maintaining component, and wherein said isolation gate is switched to functionally isolate said non-state-maintaining component from said state-maintaining component when said second power rail is switched to a power-on state, and switched to functionally link said state-maintaining component to said non-state-maintaining component when said second power rail is in a power-on state.

12. The circuit recited in claim 11, wherein said isolation gate is switched to functionally isolate said non-state-maintaining component from said state-maintaining component when said second power rail is switched to a power-off state.

13. The circuit recited in claim 11 wherein said isolation gate comprises a NOR gate.

14. The circuit recited in claim 9, wherein said sequential logic gate comprises a high threshold switching-voltage, low-leakage transistor, and wherein said combinational logic gate comprises a low threshold switching-voltage, high-performance transistor.

* * * * *